(12) United States Patent
Mednik et al.

(10) Patent No.: US 8,461,777 B1
(45) Date of Patent: Jun. 11, 2013

(54) PROTECTION FROM SHORT CATHODE CONDITION IN LED DRIVER AND METHOD THEREFOR

(75) Inventors: Alexander Mednik, Campbell, CA (US); Rohit Tirumala, Sunnyvale, CA (US)

(73) Assignee: Supertex, Inc., Sunnyvale, CA (US)

( * ) Notice: Subject to any disclaimer, the term of this patent is extended or adjusted under 35 U.S.C. 154(b) by 431 days.

(21) Appl. No.: 12/818,859

(22) Filed: Jun. 18, 2010

Related U.S. Application Data

(60) Provisional application No. 61/333,156, filed on May 10, 2010.

(51) Int. Cl.
*H05B 37/00* (2006.01)

(52) U.S. Cl.
USPC .......... 315/307; 315/185 R; 315/193; 315/308

(58) Field of Classification Search
USPC .......... 315/246, 224, 312, 287, 283, 307, 315/308, 185 R, 193
See application file for complete search history.

(56) References Cited

U.S. PATENT DOCUMENTS

| 7,598,685 B1 * | 10/2009 | Shteynberg et al. ........ 315/308 |
| 2009/0302776 A1 * | 12/2009 | Szczeszynski ............ 315/246 |

\* cited by examiner

*Primary Examiner* — David H Vu
(74) *Attorney, Agent, or Firm* — Weiss & Moy, P.C.; Jeffrey D. Moy

(57) ABSTRACT

A Light Emitting Diode (LED) driver for preventing shorting has an LED driver circuit. A protection circuit is coupled to the LED driver to detect a fault condition by monitoring a cathode of an LED string of the LED driver, an LED current sense voltage of the LED driver, an LED current feedback error voltage of the LED driver circuit, and a state of a dimming switch of the LED driver.

14 Claims, 3 Drawing Sheets

PROTECTION FROM SHORT CATHODE CONDITION IN LED DRIVER AND METHOD THEREFOR

RELATED APPLICATIONS

The present application claims the benefit to and is related herewith to U.S. patent application entitled, "PROTECTION FROM SHORT CATHODE CONDITION IN LED DRIVER", filed May 10, 2010, and having U.S. Ser. No. 61/333,156 in the name of the same inventors, and which is incorporated herein by reference in its entirety.

FIELD OF THE INVENTION

The present invention relates generally to a Light Emitting Diode (LED) circuit and, more specifically, to a protection circuit for an LED driver wherein the protection circuit is a fully ground-referenced protection circuit that is able to reduce the backlight cost and component count.

BACKGROUND OF THE INVENTION

Backlights of large-screen LCD panels use a large number of light-emitting diodes (LED) often connected in series strings. Wiring of these strings is typically extensive, and an inadvertent electrical contact sometimes occurs in assembly between one of the LED string taps and the metal chassis. Usually, the current feedback is derived at the cathode terminal of the LED string, and it is referenced to the chassis potential as well. Hence, such an inadvertent contact causes a loss of the current feedback signal.

Such a defect is difficult to detect in production, since the LEDs remain lit, although possibly powered by increased current. Hence, this defect could potentially cause damage to the LED backlight. Protection from this short circuit condition usually requires sensing the LED current at a high-voltage potential, associated with the forward voltage drop across the LED string. Such approach requires a relatively expensive high-voltage signal level translator circuit that is not well-suitable for integration with the LED driver control IC.

Therefore, it would be desirable to provide a circuit and method that overcomes the above problems. The circuit may be a fully ground-referenced protection circuit that would be able to reduce the backlight cost and component count.

SUMMARY

In accordance with one embodiment, a Light Emitting Diode (LED) driver circuit is provided. A protection circuit is coupled to the LED driver to detect a fault condition by monitoring a voltage at a cathode of an LED string and a state of a dimming switch of the LED driver.

In accordance with one embodiment, a Light Emitting Diode (LED) driver circuit is provided. A protection circuit is coupled to the LED driver circuit to detect a fault condition by monitoring an LED current sense voltage of the LED driver, an LED current feedback error voltage of the LED driver circuit, and a state of a dimming switch of the LED driver.

In accordance with one embodiment, a Light Emitting Diode (LED) driver circuit is provided. A protection circuit is coupled to the LED driver circuit to detect a fault condition by monitoring a cathode of an LED string of the LED driver, an LED current sense voltage of the LED driver, an LED current feedback error voltage of the LED driver circuit, and a state of a dimming switch of the LED driver.

In accordance with another embodiment, a method for monitoring a Light Emitting Diode (LED) driver for shorting comprises: monitoring a dimming switch of the LED driver; monitoring a voltage of at the dimming switch; monitoring a voltage at a current sense resistor of the LED driver; monitoring a voltage at an output of an error amplifier of the LED driver; and sending a fault signal to turn off the LED driver when one of the dimming switch is open and voltage at the dimming switch is lower than a predetermined level or the dimming switch is closed, the voltage at the current sense resistor is lower than a predetermined current sense voltage level and the voltage at the output of the error amplifier is higher than a predetermined error amplifier voltage.

The present invention will be more apparent from the following detailed description taken in conjunction with the accompanying drawings.

BRIEF DESCRIPTION OF THE DRAWINGS

Common reference numerals are used throughout the drawings and detailed description to indicate like elements.

DETAILED DESCRIPTION

The present invention is a detection circuit that may be able to detect any inadvertent contact of an LED string cathode or a middle tap of the LED string to a chassis by interpreting signal levels available with respect to the chassis ground potential. Thus, the present invention allows integration of this circuit with the control IC, and yields a potentially lower cost LED driver.

The detection circuit is able to detect the fault condition by monitoring three nodes in the LED current feedback: the most negative LED string potential (cathode), the LED current sense voltage, and the LED current feedback error voltage. The circuit interprets these voltage levels depending on the dimming input state.

Figure 1:
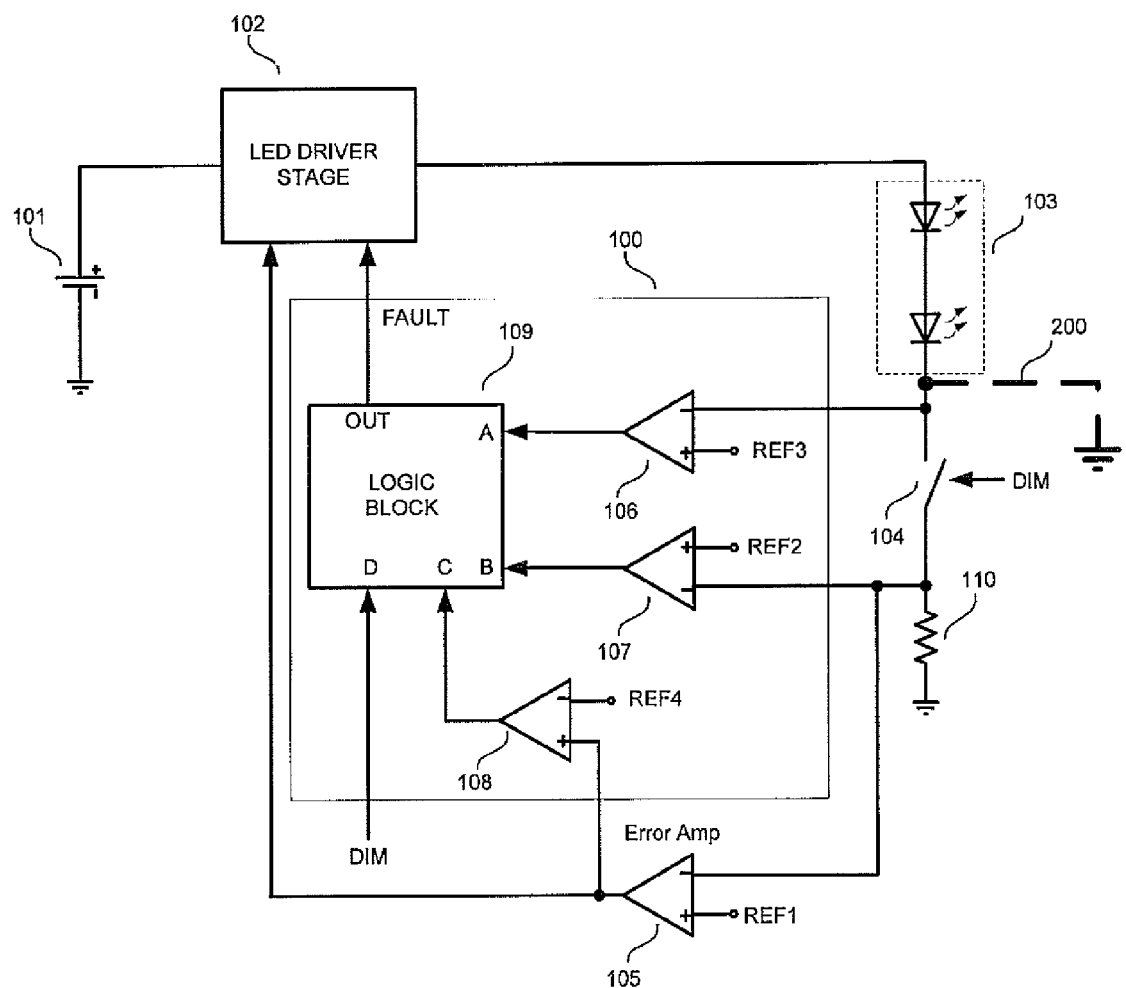
FIG. 1 is a schematic diagram of an LED driver employing the protection circuit of the present invention.

Referring now to FIG. 1, an LED driver 10 employing a protection circuit 100 is shown. The LED driver 10 may include an LED driver stage 102. The LED driver stage 102 may receive an input voltage from a voltage source 101 and deliver regulated current to an LED string 103 coupled to the LED driver stage 102. The LED string 103 is powered from the LED driver stage 102 via a dimming switch 104 and a current sense resistor 110 which are coupled in series. The dimming switch 104 is controlled by an external pulsed dimming signal DIM. The sense resistor 110 is referenced to the chassis ground potential.

The LED driver 10 may further include an error amplifier 105. The error amplifier 105 may be used to compare a current feedback signal from the sense resistor 110 to a reference voltage REF1.

The LED driver 10 may be coupled to a protection circuit 100. The protection circuit 100 may be comprised of a logic block 109. The logic block 109 may have a plurality of inputs. In the embodiment shown in FIG. 1, the logic block 109 has four inputs A, B, C and D and an output OUT. One input of the logic block 109 is coupled to an output of a cathode voltage comparator 106. The cathode voltage comparator 106 has a first input coupled to a cathode of the LED string 103. A second input of the cathode voltage comparator 106 is coupled to a reference voltage REF3. A second input of the logic block 109 is coupled to an output of a current sense comparator 107. The current sense comparator has a first input coupled to a terminal of the current sense resistor 110. A second input of the current sense comparator 107 is coupled to a reference voltage REF2. A third input of the logic block 109 is coupled to an output of an error voltage comparator 108. The error voltage comparator 108 has a first input coupled to an output of the error amplifier 105 and a second input coupled to a reference voltage REF4. The logic block 109 has a fourth input coupled to the external pulsed dimming signal DIM.

In the embodiment shown in FIG. 1, the output of the cathode voltage comparator 106 is coupled to the input A of the logic block 109, the output of the current sense comparator 107 is coupled to the input B of the logic block 109, and the output of the error voltage comparator 108 is coupled to the input C of the logic block 109. The logic block 109 also receives the dimming signal DIM at the input D.

The output terminal OUT generates a fault signal FAULT derived in accordance with the equation: OUT=(A $\wedge$ $\overline{D}$)$\vee$ (C $\wedge$ B $\wedge$ D). Hence, the output OUT reports a fault signal FAULT when either: 1) switch 104 is open, and voltage at the switch 104 is lower than REF3; or: 2) switch 104 is closed, and voltage at the current sense resistor 110 is lower than REF2, and, at the same time, voltage at the output of the error amplifier 105 is higher than REF4. The protection circuit 100 reports the fault signal FAULT from the output OUT to the LED driver stage to trigger its shutdown, when a short circuit 200 occurs between the cathode and ground.

Figure 2:
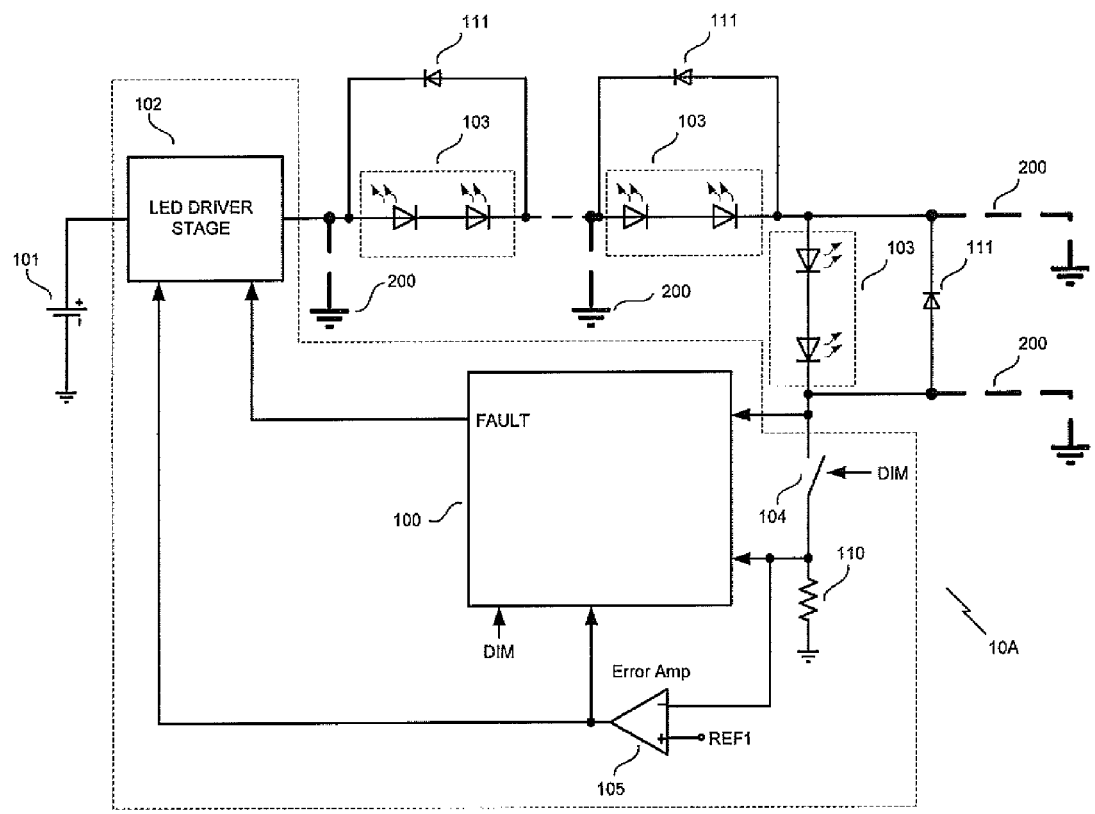
FIG. 2 shows the LED driver of FIG. 1, where each LED string is shunted by an anti-parallel diode.

In some cases, there may be a plurality of series-connected LED strings 103 used. Hence, there is a possibility of a short circuit 200 between the interconnecting wires and the chassis ground. Referring now to FIG. 2, an LED driver 10A employing a protection circuit 100 is shown. The protection circuit 100 is the same as described in the previous embodiment of FIG. 1. The LED driver 10A is similar to that shown in FIG. 1. The LED driver 10A may have an LED driver stage 102 that may receive an input voltage from a voltage source 101 and deliver regulated current to a plurality of series-connected LED strings 103. The plurality of series-connected LED strings 103 is powered from the LED driver stage 102 via a dimming switch 104 and a current sense resistor 110 which are coupled in series. The dimming switch 104 is controlled by an external pulsed dimming signal DIM. The sense resistor 110 is referenced to the chassis ground potential.

The LED driver 10A may further include an error amplifier 105. The error amplifier 105 may be used to compare a current feedback signal from the sense resistor 110 to a reference voltage REF1.

In this embodiment, each LED string 103 is shunted by an anti-parallel diode 111. The diode 111 becomes forward-biased in the case of the short circuit 200, resulting in a voltage potential at the switch 104 lower than REF3 (FIG. 1). Hence, the operation of the protection circuit 100 of FIG. 2 is identical to the one of FIG. 1.

Figure 3:
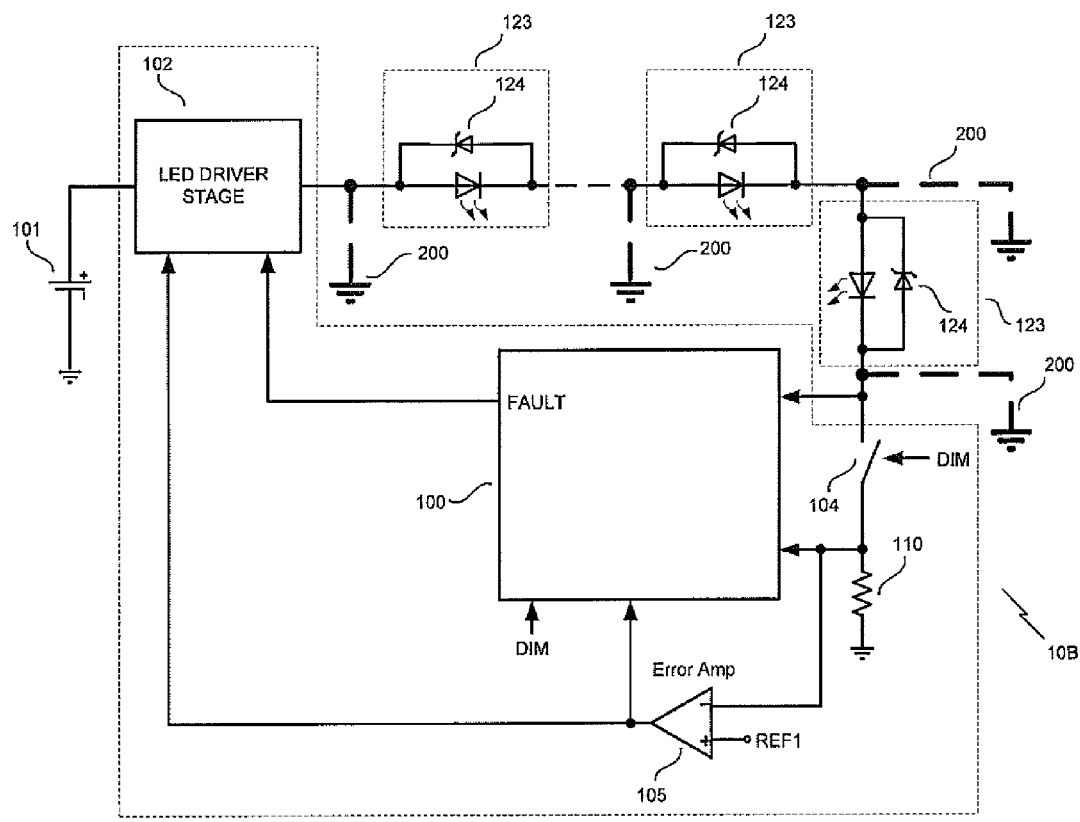
FIG. 3 shows an LED driver of FIG. 1 driving a string of individual LEDs.

Referring now to FIG. 3, an LED driver 10B employing a protection circuit 100 is shown. The protection circuit 100 is the same as described in the previous embodiment of FIG. 1. The LED driver 10B is similar to that shown in FIGS. 1 and 2. The LED driver 10B may have an LED driver stage 102 that may receive an input voltage from a voltage source 101 and deliver regulated current to a plurality of series-connected LEDs 123. The plurality of series-connected LEDs 123 is powered from the LED driver stage 102 via a dimming switch 104 and a current sense resistor 110 which are coupled in series. The dimming switch 104 is controlled by an external pulsed dimming signal DIM. The sense resistor 110 is referenced to the chassis ground potential. The LED driver 10A may further include an error amplifier 105. The error amplifier 105 may be used to compare a current feedback signal from the sense resistor 110 to a reference voltage REF1.

In this embodiment, each LED 123 includes a built in anti-parallel Zener diode 124 to prevent a single open-LED failure to extinguish the entire LED string. In such case, the operation of the protection circuit 100 in the case of the fault 200 is also identical to one of FIG. 1 with proper selection of the reference level REF3.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one skilled in the art in view of this disclosure.

What is claimed is:

1. A Light Emitting Diode (LED) driver for preventing shorting comprising:
    an LED driver circuit; and
    a protection circuit coupled to the LED driver to detect a fault condition by monitoring an LED current sense voltage of the LED driver, an LED current feedback error voltage of the LED driver circuit, and a state of a dimming switch of the LED driver.

2. A Light Emitting Diode (LED) driver for preventing shorting in accordance with claim 1 wherein the protection circuit comprises:
    a logic block for sending a signal to deactivate the LED driver circuit when a fault condition is detected;
    a current sense comparator having an output coupled to the logic block and inputs coupled to a current sense resistor of the LED driver and to a current sense reference voltage;
    a current feedback error comparator having an output coupled to the logic block and inputs coupled to the current sense resistor and a current feedback error reference voltage; and
    a dimming switch signal coupled to the dimming switch of the LED driver and to a second input of the logic block for controlling operation of the dimming switch.

3. A Light Emitting Diode (LED) driver for preventing shorting in accordance with claim 1 wherein the LED driver circuit comprises:
    an LED driver stage coupled to an output of the protection circuit, the LED driver stage receiving an input voltage from a voltage source;
    wherein the LED string coupled to the LED driver stage, the switch is coupled to the LED string, and the current sense resistor is coupled to the dimming switch.

4. A Light Emitting Diode (LED) driver for preventing shorting in accordance with claim 3 wherein the LED driver circuit further comprises an error amplifier coupled to the current sense resistor.

5. A Light Emitting Diode (LED) driver for preventing shorting comprising:
    an LED driver circuit; and
    a protection circuit coupled to the LED driver to detect a fault condition by monitoring a cathode of an LED string of the LED driver, an LED current sense voltage of the LED driver, an LED current feedback error voltage of the LED driver circuit, and a state of a dimming switch of the LED driver.

6. A Light Emitting Diode (LED) driver for preventing shorting in accordance with claim 5 wherein the protection circuit comprises:
- a logic block for sending a signal to deactivate the LED driver circuit when the fault condition is detected;
- a first comparator having a first comparator output coupled to a first input of the logic block and first comparator inputs coupled to a first reference voltage and to the cathode of an LED string;
- a second comparator having a second comparator output coupled to a second input of the logic block and second comparator inputs coupled to a second reference voltage and to the LED current sense voltage; and
- a third comparator having a third comparator output coupled to a third input of the logic block and third comparator inputs coupled to a third reference voltage and the LED current feedback error voltage.

7. A Light Emitting Diode (LED) driver for preventing shorting in accordance with claim 6 wherein the protection circuit further comprises: a fourth input of the logic block coupled to an external pulsed dimming signal.

8. A Light Emitting Diode (LED) driver for preventing shorting in accordance with claim 5 wherein the LED driver circuit comprises:
- an LED driver stage coupled to an output of the protection circuit, the LED driver stage receiving an input voltage from a voltage source;
- the LED string coupled to the LED driver stage;
- the dimming switch coupled to the LED string; and
- a current sense resistor coupled to the dimming switch.

9. A Light Emitting Diode (LED) driver for preventing shorting in accordance with claim 8 wherein the LED driver circuit further comprises an error amplifier coupled to the current sense resistor.

10. A Light Emitting Diode (LED) driver for preventing shorting in accordance with claim 8 wherein the LED driver circuit further comprises an error amplifier coupled to the current sense resistor, the error amplifier compares the current feedback signal to a reference voltage.

11. A Light Emitting Diode (LED) driver for preventing shorting in accordance with claim 5 wherein the LED string comprises a plurality of series-connected LED strings.

12. A Light Emitting Diode (LED) driver for preventing shorting in accordance with claim 11 further comprising an anti-parallel diode coupled to each of the plurality of series-connected LED strings.

13. A Light Emitting Diode (LED) driver for preventing shorting in accordance with claim 5 wherein the LED string comprises a plurality of individual LEDs connected in series.

14. A Light Emitting Diode (LED) driver for preventing shorting in accordance with claim 13 further comprising a Zener diode coupled to each of the plurality of series-connected LEDs.

* * * * *